US008905687B2

(12) United States Patent
Blatz

(10) Patent No.: US 8,905,687 B2
(45) Date of Patent: Dec. 9, 2014

(54) HAND-HELD POWER TOOL GUIDING DEVICE AND METHOD

(75) Inventor: Thomas Blatz, Kaufering (DE)

(73) Assignee: Hilti Aktiengesellschaft, Schaan (LI)

( * ) Notice: Subject to any disclaimer, the term of this patent is extended or adjusted under 35 U.S.C. 154(b) by 793 days.

(21) Appl. No.: 13/161,790

(22) Filed: Jun. 16, 2011

(65) Prior Publication Data

US 2011/0318124 A1 Dec. 29, 2011

(30) Foreign Application Priority Data

Jun. 17, 2010 (DE) ......................... 10 2010 030 219

(51) Int. Cl.
*B23B 45/14* (2006.01)
*B25F 5/02* (2006.01)
*B25H 1/00* (2006.01)

(52) U.S. Cl.
CPC .............. *B25F 5/021* (2013.01); *B25H 1/0035* (2013.01); *Y10S 408/712* (2013.01)
USPC ............... 408/1 R; 408/9; 408/136; 408/234; 408/712

(58) Field of Classification Search
CPC ...... B25F 5/021; B25H 1/0035; B25H 1/0042
USPC ................. 408/8, 9, 136, 234, 712; 30/296.1; 173/170
IPC ........................................................ B23B 45/14
See application file for complete search history.

(56) References Cited

U.S. PATENT DOCUMENTS 2,405,110 A * 8/1946 Bullock ........................ 173/141
2,643,088 A * 6/1953 Hornack ....................... 173/152
2,879,678 A * 3/1959 Kaiser, Jr. ........................ 408/76
3,068,722 A * 12/1962 Alvaro ........................... 408/136
3,247,586 A * 4/1966 Westfall ........................... 29/714
3,447,454 A * 6/1969 Ratz .............................. 100/266
3,552,239 A * 1/1971 Yeaman et al. ............... 408/146
3,985,188 A 10/1976 Steele
4,284,373 A * 8/1981 Wolff .............................. 408/87
4,442,905 A * 4/1984 Agoston ......................... 173/36
4,585,376 A * 4/1986 Davenport et al. ........... 408/110
5,046,900 A * 9/1991 Heiter et al. .................... 408/84

(Continued)

FOREIGN PATENT DOCUMENTS

DE 19501663 A1 * 7/1996 ............. F16M 11/18
FR 2750628 A1 * 1/1998 .............. B23B 45/14

(Continued)

OTHER PUBLICATIONS

German Search Report, dated Jan. 13, 2011, 2 pages.

(Continued)

*Primary Examiner* — Eric A Gates
(74) *Attorney, Agent, or Firm* — Crowell & Moring LLP

(57) ABSTRACT

A hand-held power tool guiding device and method is disclosed. The device includes a receptacle element for receiving the power tool, a remote control device for operating the power tool, and a transmission device for transmitting the movement of the remote control device to the power tool. The transmission device has a switch actuator and a connecting element, where the switch actuator is adjustable into a standby position during insertion of the power tool into the receptacle element.

14 Claims, 5 Drawing Sheets

(56) References Cited

U.S. PATENT DOCUMENTS

| | | | | | |
|---|---|---|---|---|---|
| 5,137,235 | A * | 8/1992 | Wentworth et al. | ........ | 248/124.1 |
| 5,322,397 | A * | 6/1994 | Spear | .............................. | 408/99 |
| 5,361,851 | A * | 11/1994 | Fox | .............................. | 173/170 |
| 5,598,892 | A | 2/1997 | Fox | | |
| 5,676,503 | A * | 10/1997 | Lang | ............................ | 408/234 |
| 5,797,708 | A * | 8/1998 | Bencic | .......................... | 408/112 |
| 5,820,317 | A * | 10/1998 | Van Troba | .................... | 408/136 |
| 5,888,031 | A * | 3/1999 | Buck et al. | ...................... | 408/56 |
| 6,095,724 | A * | 8/2000 | Hurt | .............................. | 408/136 |
| 6,264,407 | B1 * | 7/2001 | Tinken | .......................... | 408/136 |
| 7,226,252 | B2 * | 6/2007 | Glodowski | .................... | 408/1 R |
| 7,228,917 | B2 * | 6/2007 | Davis et al. | ................... | 173/170 |
| 2005/0152756 | A1 * | 7/2005 | Howard | ........................ | 408/103 |
| 2005/0214085 | A1 * | 9/2005 | Owens | .......................... | 408/136 |
| 2008/0202264 | A1 | 8/2008 | Howland | | |

FOREIGN PATENT DOCUMENTS

| | | | | | |
|---|---|---|---|---|---|
| JP | 06047609 | A * | 2/1994 | .............. | B23B 45/14 |
| JP | 06114616 | A * | 4/1994 | .............. | B23B 45/14 |
| JP | 06190617 | A * | 7/1994 | .............. | B23B 45/14 |
| JP | 2004276152 | A * | 10/2004 | .............. | B23B 45/14 |

OTHER PUBLICATIONS

1. U.S. Patent Application, "Hand-Held Power Tool Guiding Device", filed Jun. 16, 2011, Inventor Thomas Blatz.

* cited by examiner

HAND-HELD POWER TOOL GUIDING DEVICE AND METHOD

This application claims the priority of German Patent Document No. 10 2010 030 219.8, filed Jun. 17, 2010, the disclosure of which is expressly incorporated by reference herein.

BACKGROUND AND SUMMARY OF THE INVENTION

The present invention relates to a hand-held power tool guiding device and method.

Drilling overhead in ceilings using hand-operated drilling equipment presents difficulties for the operator. Drilling equipment, above all core drills, is very heavy so that the operator is only able to manually apply the required feed force for a brief time. Furthermore, because of the ceiling height the operator must work on ladders or other auxiliary equipment in order to create boreholes in the ceiling.

Guiding devices in the form of ceiling drill stands in which hand-operated drilling equipment is inserted are known for creating boreholes in ceilings. Additional examples of known guiding devices are drill stands for creating boreholes in walls or in the floor and moveable guide wagons equipped with rollers for creating kerfs in the floor. The various drilling tools, sawing tools and other power tools are summarized under the designation "power tool."

Known guiding devices include a receptacle element, in which the power tool is inserted and fastened, a remote control device for turning the power tool on and off and a transmission device for transmitting the movement of the remote control device to the power tool, wherein the transmission device has a switch actuator and a connecting element. Remote control is accomplished via an electrical interface to which the power tool is attached and which is turned on and off via the remote control device or via a mechanical remote control device.

The disadvantage of known guiding devices is that the electrical remote control can only be used for power tools that do not have a restart interlock. The restart interlock is a safety function that is relevant for hand-operated power tools and prevents a power tool whose supply of power was interrupted from restarting automatically. The restart interlock must be activated before the power tool can be operated again.

In the case of power tools with a restart interlock, remote control is effected via a mechanical remote control device, which includes a hand lever, a Bowden cable and a switch actuator. The operator must connect the device switch, which is used to turn the power tool on and off, to the switch actuator so that the movement of the hand lever can be transmitted to the device switch.

It would be desirable to improve a device for guiding a power tool with regard to the disadvantages explained above. The object of the present invention is making available a device for guiding a power tool in which the switch actuator can be brought into the correct position with little effort.

According to the invention, it is provided that the switch actuator is adjustable into a Standby position by the power tool during insertion of the power tool into the receptacle element. The switch actuator, which transmits the movement of the remote control device to a device switch of the power tool, is moved automatically during insertion into an operationally ready position, which is designated as the Standby position. The operator does not have to perform an additional work step in order to move the switch actuator into the Standby position.

In a preferred embodiment, the switch actuator is configured to be rotatable around an axis in a rotational direction. It is especially preferred if the switch actuator is also configured to be displaceable along the axis. Because of the additional displaceability of the switch actuator along the axis, the movement of the remote control device is transmitted to the device switch with the same component which moves the switch actuator into the Standby position. The integration of functions produces a compact design, because fewer components are required.

In a preferred embodiment, the switch actuator is configured as a swiveling/sliding element having a sliding element and a swivel element, which has a first and second arm, wherein the first and second arms of the swiveling element are especially preferably connected to the sliding element.

The switch actuator is mounted on the receptacle element by at least one mount, wherein preferably two mounts are provided on the receptacle element. The mounts are designed as latches on the receptacle element or as boreholes in the receptacle element. Because of the mounting of the switch actuator on the receptacle element, the switch actuator is always arranged correctly and does not have to be kept separately.

In a preferred embodiment, the transmission device has a reset device for resetting the switch actuator. By resetting the switch actuator, the switch actuator is directly ready for operation again after removal of the power tool and the operator does not have to manually adjust it to the correct position.

In a variant, the reset device includes a first resetting element, which acts in the displacement direction, and a second resetting element, which acts in the rotational direction, and, in an alternative variant, a resetting element, which acts both in the displacement direction as well as in the rotational direction. A resetting element which resets the switch actuator to the displacement direction and rotational direction produces a compact design of the transmission device, because fewer components are required.

The resetting element is preferably configured as a compression leg spring, wherein the compression leg spring especially preferably has a first leg, which is supported on the receptacle element, and a second leg, which is supported on the switch actuator. The first and second legs of the compression leg spring are especially preferably pre-tensioned on the receptacle element and on the switch actuator. The restoring force of the compression leg spring makes sure that the switch actuator is moved back via displacement into the Standby position after the remote control device is let go of and rotated back into the Off position after the power tool is removed.

Exemplary embodiments of the invention are described in the following on the basis of the drawings. These drawings are not necessarily supposed to represent the exemplary embodiments to scale, rather the drawings are executed in a schematic or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment can be undertaken without deviating from the general idea of the invention. The features of the invention disclosed in the description, the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter, which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

Additional advantages, features and details of the invention are disclosed in the following description of the preferred exemplary embodiment as well as on the basis of the drawings.

DETAILED DESCRIPTION OF THE DRAWINGS

Figure 1:
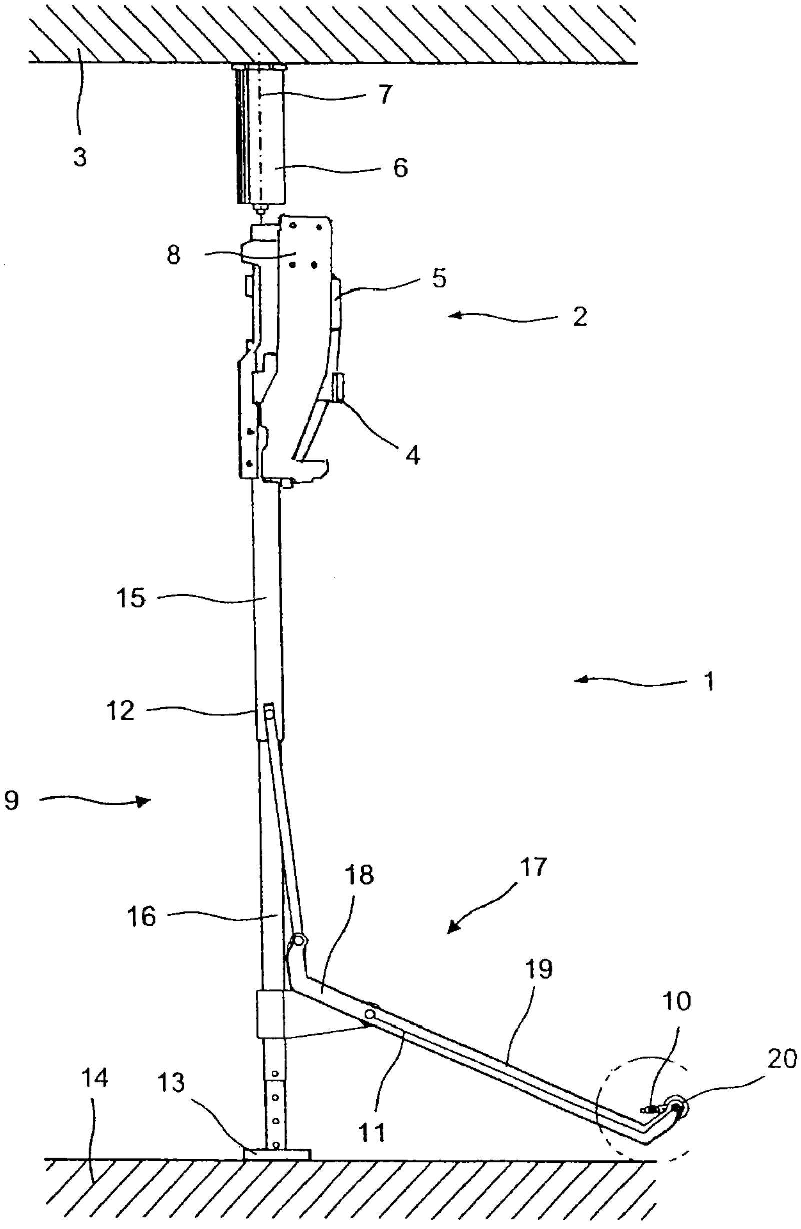
FIG. 1 illustrates a drill stand according to the invention with a drilling apparatus for creating boreholes in a ceiling.

FIG. 1 depicts a guiding device 1 according to the invention configured as a drill stand and having a power tool 2, which is configured as a drilling apparatus and is inserted into the drill stand 1. The drill stand 1 is configured as a ceiling drill stand for creating boreholes in a ceiling 3. Other examples of guiding devices according to the invention are drill stands for creating boreholes in walls or in the floor, and moveable guide wagons for creating kerfs in walls, floors and/or the ceiling.

The drilling apparatus 2 is made of a handle 4 for holding and guiding the drilling apparatus 2 and a motor and gear unit 5, which drives a tool 6 around an axis of rotation 7. A device switch is integrated into the handle 4 for the operator to turn the drilling apparatus 2 on and off.

The drill stand 1 is comprised of a receptacle element 8 for receiving the drilling apparatus 2, an adjustable guiding and support device 9 and a remote control device 10 for the operator to operate the drilling apparatus 2 at a remote location away from the handle 4 of the drilling apparatus 2. The movement of the remote control device 10 is transmitted to the drilling apparatus 2 via a transmission device 11.

The guiding and support device 9 is made of a guide rod 12, which rests on a base 14 via a support foot 13. The guide rod 12 is designed to be two-piece with a first section 15 and a second section 16, which are free to slide relative to one other in a telescoping manner. The first section 15 is connected to the receptacle element 8 and the second section 16 is connected to the support foot 13. Moving the drilling apparatus 2 against the ceiling 3 is accomplished via a feed device 17, which has a lifting device 18 and an adjusting lever 19. The lifting device 18 may be configured as a pressurized cylinder, as a gear rod, as a spindle or as a comparable lifting device. A handle 20, which is used to actuate the adjusting lever 19, is attached to the adjusting lever 19. The adjusting lever 19 is designed to be adjustable between a first and a second end position.

Figure 2:
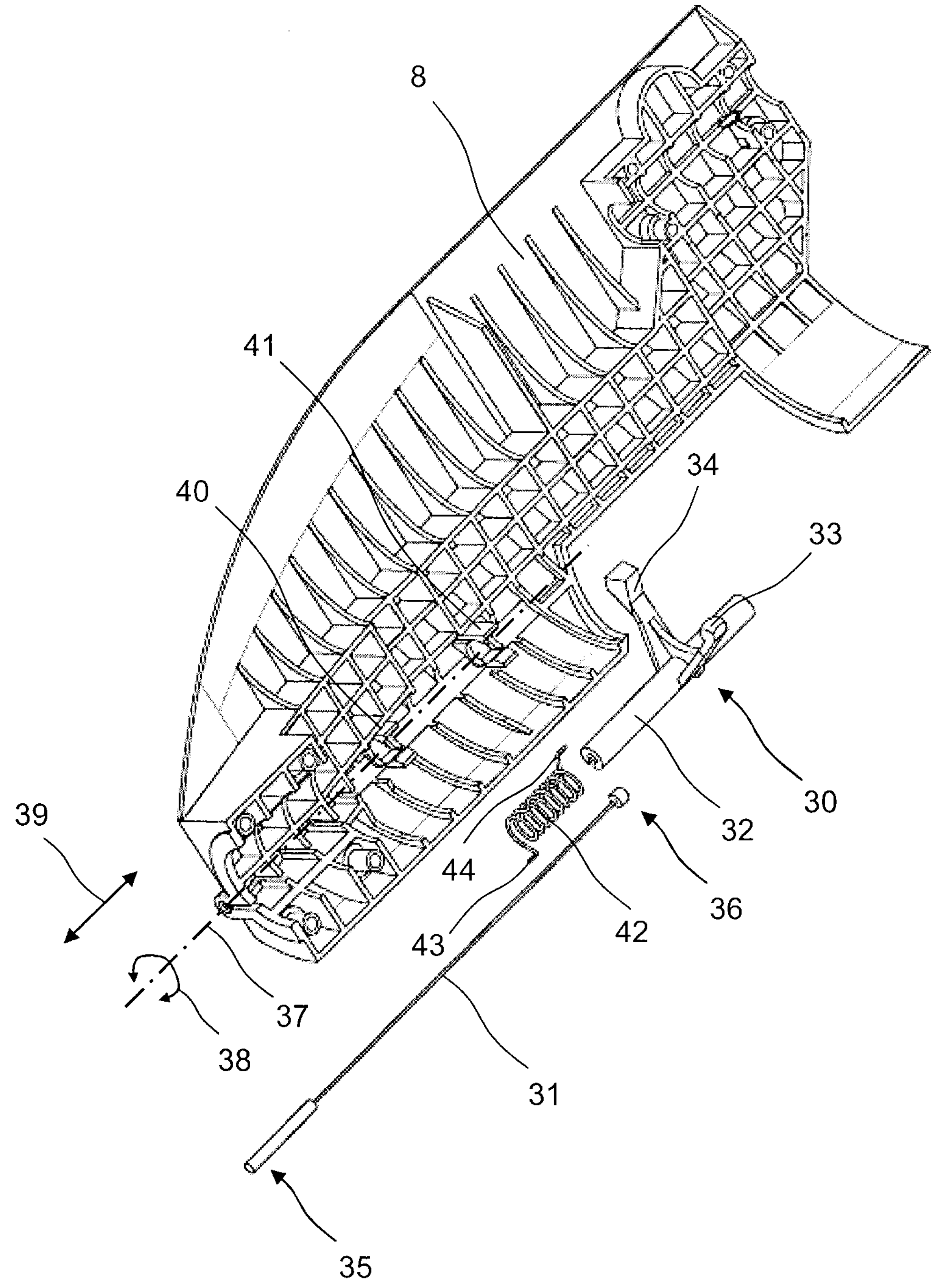
FIG. 2 is a detailed view of the transmission device of the drill stand in FIG. 1 with a switch actuator and a connecting element.

FIG. 2 shows the receptacle element 8 and the transmission device 11 of the drill stand 1 in an exploded view. The transmission device 11 is made of a switch actuator 30 in the form of a swiveling/sliding element and a connecting element 31, which is configured as a Bowden cable.

A Bowden cable is a movable machine element for transmitting a mechanical movement via a flexibly installable combination of a wire cable and a stable sheath in the routing direction of the wire cable. The Bowden cable is actuated with the aid of tensile force and transmits the effect mechanically to the component. Alternatively, the connecting element 31 may be configured, for example, as a hydraulic line or as a cable pull.

The swiveling/sliding element 30 includes a sliding element 32 as well as a first arm 33 and a second arm 34, which are connected to the sliding element 32. The Bowden cable 31 is connected on a first end 35 to the remote control device 10 and on a second end 36 to the swiveling/sliding element 30. The swiveling/sliding element 30 is swivel-mounted around an axis 37 in a rotational direction 38 and configured to be displaceable along the axis 37 in a displacement direction 39. The swiveling/sliding element 30 is mounted on the receptacle element 8 via a first mount 40 and a second mount 41.

The transmission device 11 also has a reset device 42 for resetting the swiveling/sliding element 30. The reset device 42 is configured as a spring element, which is formed by a compression spring, which acts in the displacement direction 39, and a leg spring, which acts in the rotational direction 38, and is designated as a compression leg spring.

The compression leg spring 42 is a reset device, in which the resetting functions are integrated into a single spring element in the displacement direction 39 and in the rotational direction 38. Alternatively, the reset device may be made of two separated elements, which are configured, for example, as a compression spring in the displacement direction 39 and as a spring shackle in the rotational direction 38.

The compression leg spring 42 has as first leg 43 and a second leg 44. The first leg 43 is supported on the second arm 34 of the swiveling/sliding element 30 and the second leg 44 on the receptacle element 8.

Figure 3A:
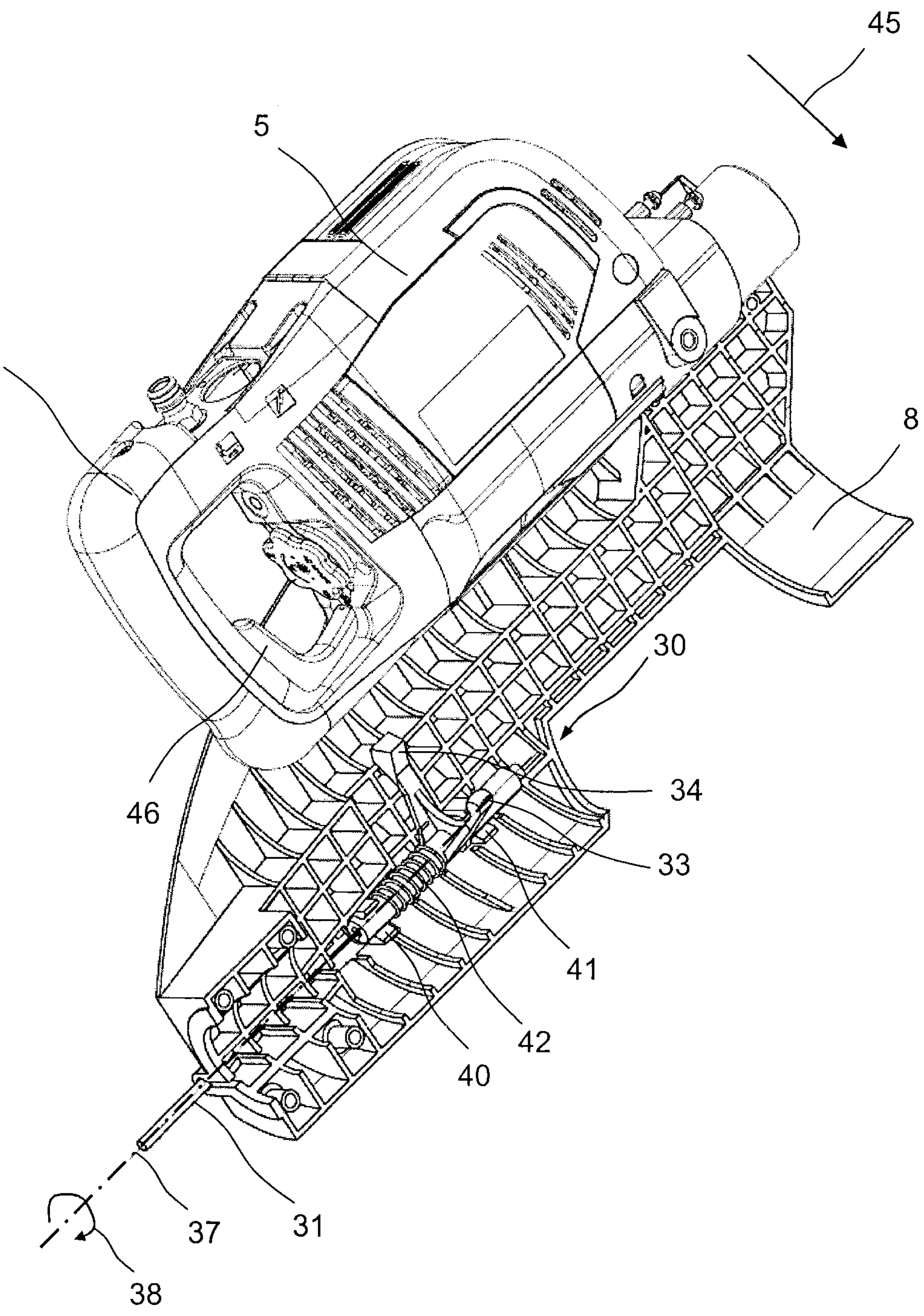
FIGS. 3*a-c* show a detailed view of the receptacle element in an Off position prior to insertion of the drilling apparatus (FIG. 3*a*), in a Standby position after insertion of the drilling apparatus (FIG. 3*b*), and in an On position after actuation of the remote control device (FIG. 3*c*).
Figure 3B:
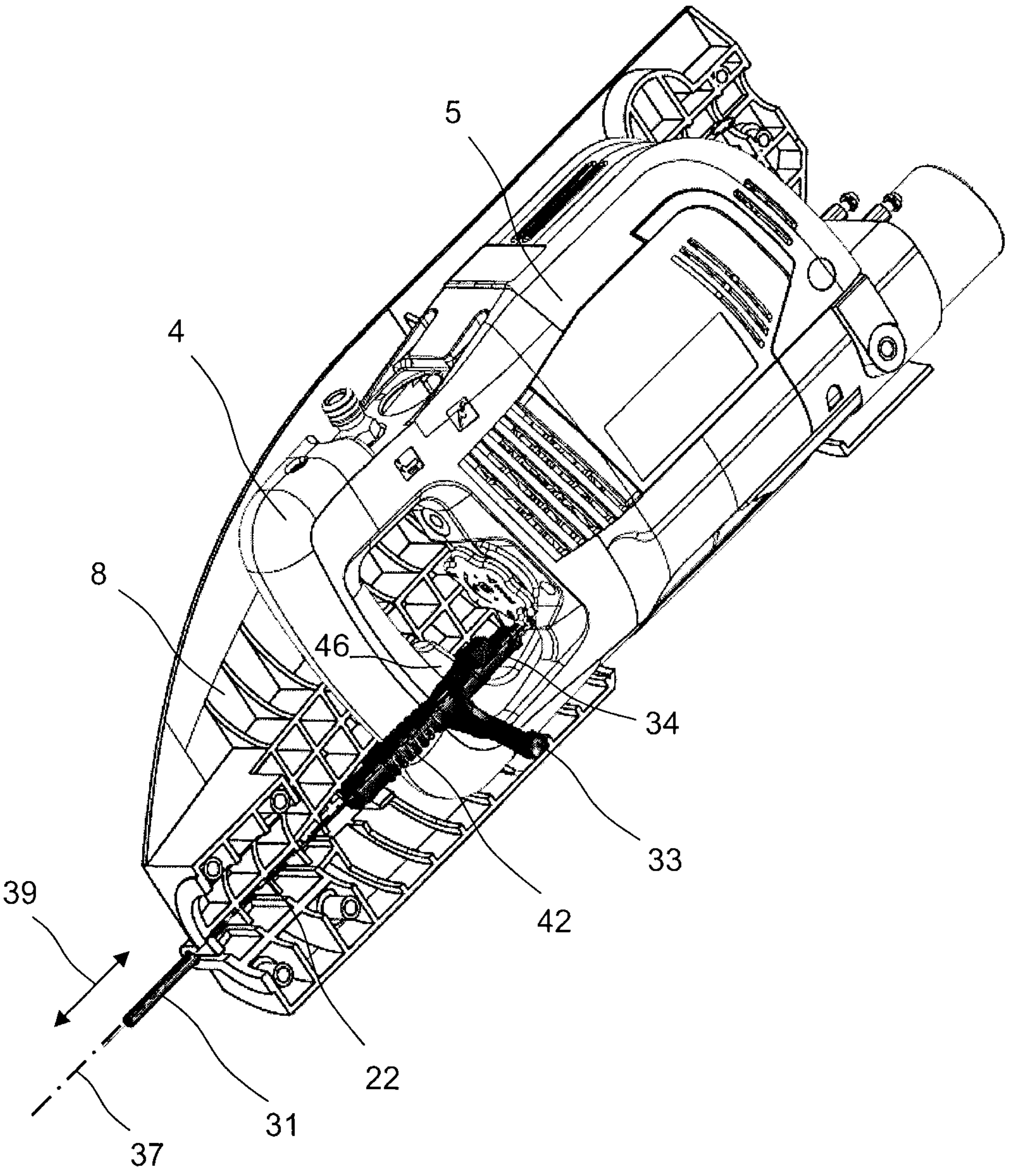
Figure 3C:
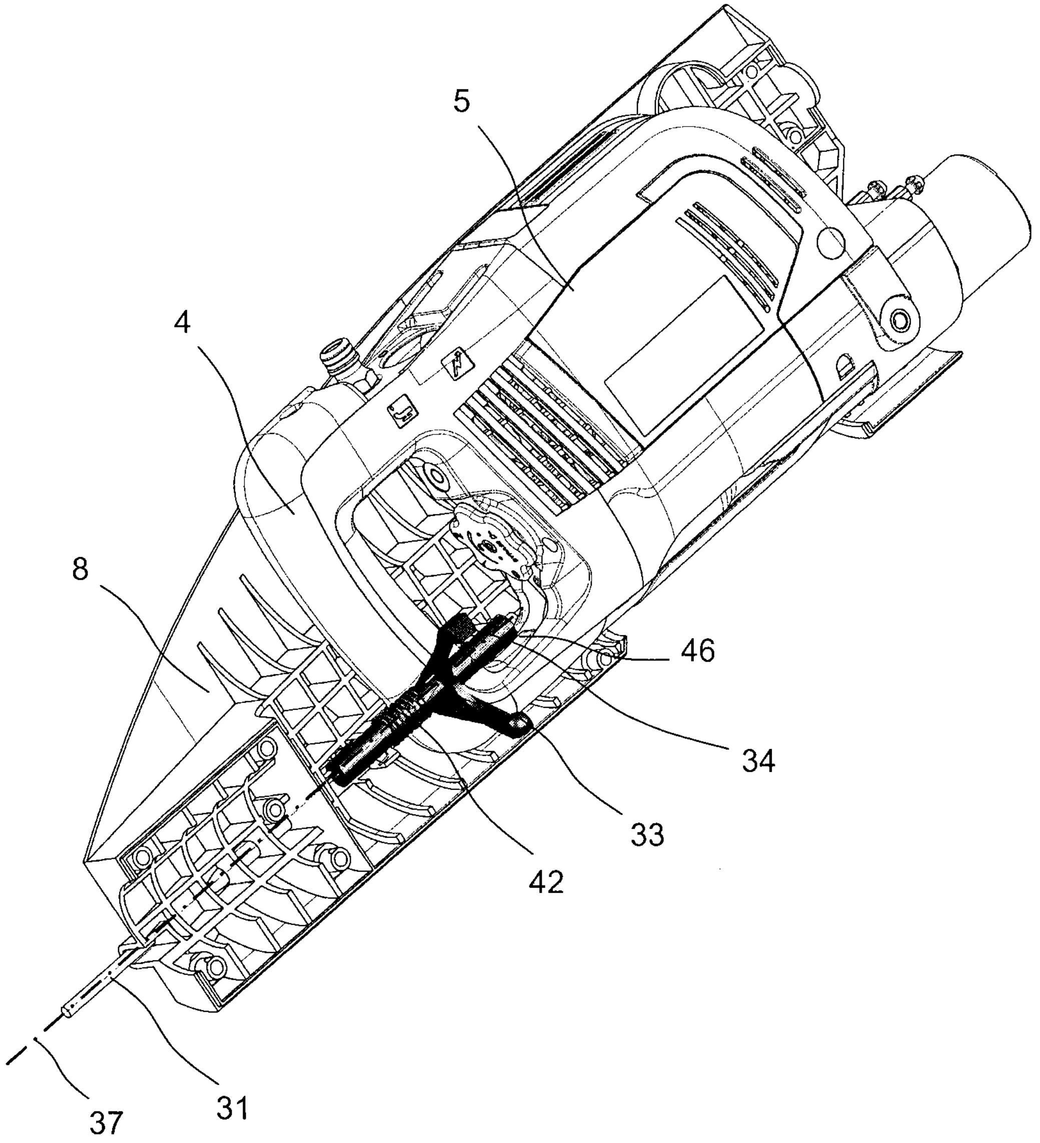

FIGS. 3*a*-3*c* show a detailed view of the receptacle element 8 and of the drilling apparatus 2 in three different positions, i.e., in a first position prior to insertion of the drilling apparatus 2 into the receptacle element 8 (FIG. 3*a*), in a second position after insertion of the drilling apparatus 2 (FIG. 3*b*), and in a third position after actuation of the remote control device 10 (FIG. 3*c*).

FIG. 3*a* shows the receptacle element 8 of the drill stand 1 with the connected transmission device 11 prior to insertion of the drilling apparatus 2. This position of the transmission device 11 is designated as the Off position. Prior to insertion of the drilling apparatus 2, the first arm 33 of the swiveling/sliding element 30 projects into the interior of the receptacle element 8. If the drilling apparatus 2 is inserted into the receptacle element 8 in a direction 45, the handle 4 of the drilling apparatus 2 touches the first arm 33 and the swiveling/sliding element 30 avoids the handle 4 by rotating around the axis 37.

FIG. 3*b* shows the receptacle element 8 with the transmission device 11 after insertion of the drilling apparatus 2 into the receptacle element 8. This position of the transmission device 11 is designated as the Standby position. In the Standby position, the first arm 33 of the swiveling/sliding element 30 is clamped between the receptacle element 8 and handle 4 and the second arm 34 is positioned in front of a device switch 46 of the drilling apparatus 2. The device switch 46 is used to turn the drilling apparatus 2 on and off.

FIG. 3*c* shows the receptacle element 8 with the transmission device 11 after the drilling apparatus 2 has been inserted and turned on. To turn on the drilling apparatus 2, the operator actuates the remote control device 10. The movement of the remote control device 10 is transmitted to the Bowden cable 31. The Bowden cable 31 moves the swiveling/sliding element 30 in the displacement direction 39 along the axis 37 and displaces the second arm 34 of the swiveling/sliding element 30 against the device switch 46. The drilling apparatus 2 is turned on and the tool 6 is driven around the axis of rotation 7 via the motor and gear unit 5.

If the remote control device 10 is disengaged, the compression leg spring 42 moves the swiveling/sliding element 30 via the restoring force out of the On position into the Standby position and the drilling apparatus 2 is turned off via the device switch 46. If the drilling apparatus 2 is supposed to be removed from the receptacle element 8, the restoring force of the compression leg spring 42 acts on the swiveling/sliding element 30 and rotates the swiveling/sliding element 30 out of the Standby position back into the Off position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A guiding device for a power tool, comprising:

a receptacle element;

a remote control device; and a transmission device coupled between the remote control device and the receptacle element, wherein the transmission device has a switch actuator and a connecting element, wherein the transmission device includes a reset device, and wherein the switch actuator is resettable by the reset device;

wherein the reset device includes a resetting element which is actionable in a displacement direction and a rotational direction;

wherein the resetting element is a compression leg spring;

and wherein the switch actuator is adjustable into a standby position by an insertion of a power tool into the receptacle element.

2. The device according to claim 1, wherein the switch actuator is rotatable around an axis in the rotational direction.

3. The device according to claim 2, wherein the switch actuator is displaceable along the axis in the displacement direction.

4. The device according to claim 1, wherein the switch actuator includes a sliding element and a swiveling element.

5. The device according to claim 4, wherein the swiveling element includes a first arm and a second arm, wherein the first arm and the second arm are coupled to the sliding element.

6. The device according to claim 1, wherein the switch actuator is mounted on the receptacle element via at least one mount.

7. The device according to claim 1, wherein the compression leg spring has a first leg which is supported on the receptacle element and a second leg which is supported on the switch actuator.

8. The device according to claim 7, wherein the first leg is pre-tensioned on the receptacle element and the second leg is pre-tensioned on the switch actuator.

9. A method for operating a power tool guiding device, comprising the steps of:

inserting a power tool into a receptacle element of the guiding device; and adjusting a switch actuator of the guiding device into a standby position by the step of inserting the power tool into the receptacle element, wherein the switch actuator is included in a transmission device coupled between the receptacle element and a remote control device, wherein the transmission device includes a reset device, wherein the switch actuator is resettable by the reset device, wherein the reset device includes a resetting element which is actionable in a displacement direction and a rotational direction, and wherein the resetting element is a compression leg spring.

10. The method according to claim 9, further comprising the step of actuating the remote control device to turn on the power tool.

11. The method according to claim 10, wherein the step of actuating the remote control device moves the switch actuator.

12. The method according to claim 9, wherein in the standby position, a first arm of the switch actuator is clamped between the receptacle element and a handle of the power tool and a second arm of the switch actuator is positioned in front of an on/off switch of the power tool.

13. The method according to claim 9, further comprising the steps of moving the remote control device and moving the switch actuator by the step of moving the remote control device to turn on the power tool.

14. The method according to claim 13, wherein the step of moving the switch actuator includes moving the switch actuator in the displacement direction such that an arm of the switch actuator is moved against an on/off switch of the power tool.

* * * * *